United States Patent
Markle et al.

(10) Patent No.: US 7,534,357 B2
(45) Date of Patent: May 19, 2009

(54) DUAL-TRAIN WASTEWATER RECLAMATION AND TREATMENT SYSTEM

(75) Inventors: Stephen P. Markle, Arlington, VA (US); Randall J. Jones, Scottsdale, AZ (US)

(73) Assignee: Navalis Environmental Systems, LLC, Scottsdale, AZ (US)

( * ) Notice: Subject to any disclaimer, the term of this patent is extended or adjusted under 35 U.S.C. 154(b) by 5 days.

(21) Appl. No.: 11/276,880

(22) Filed: Mar. 17, 2006

(65) Prior Publication Data
US 2007/0068879 A1 Mar. 29, 2007

Related U.S. Application Data

(60) Provisional application No. 60/665,736, filed on Mar. 28, 2005, provisional application No. 60/777,520, filed on Feb. 27, 2006.

(51) Int. Cl.
C02F 1/78 (2006.01)
(52) U.S. Cl. ........................... 210/760; 210/202
(58) Field of Classification Search ............... 210/760, 210/605, 86, 202
See application file for complete search history.

(56) References Cited

U.S. PATENT DOCUMENTS

| | | | |
|---|---|---|---|
| 3,822,786 A | 7/1974 | Marschall | |
| 3,945,918 A | 3/1976 | Kirk | |
| 4,053,399 A | 10/1977 | Donnelly et al. | |
| 4,072,613 A * | 2/1978 | Alig | 210/198.1 |
| 4,156,648 A | 5/1979 | Kuepper | |
| 4,197,200 A | 4/1980 | Alig | |
| 4,214,887 A | 7/1980 | van Gelder | |
| 4,233,152 A | 11/1980 | Hill et al. | |
| 4,255,262 A | 3/1981 | O'Cheskey et al. | |
| 4,961,857 A | 10/1990 | Ottengraf et al. | |
| 5,053,140 A | 10/1991 | Hurst | |
| 5,178,755 A * | 1/1993 | LaCrosse | 210/195.1 |
| 5,180,499 A | 1/1993 | Hinson et al. | |

(Continued)

FOREIGN PATENT DOCUMENTS

EP 261822 8/1990

(Continued)

OTHER PUBLICATIONS

International Searching Authority, International Search Report and Written Opinion, PCT/US2006/010165, Aug. 16, 2006.

Primary Examiner—Walter D Griffin
Assistant Examiner—Cameron J Allen
(74) Attorney, Agent, or Firm—Venable, Campillo, Logan & Meaney, P.C.

(57) ABSTRACT

A wastewater treatment system for use on marine vessels or land-based applications where wastewater is separated into two separate sources as graywater and raw sewage (blackwater). For blackwater, the treatment system incorporates five general phases (or zones): (1) screening, (2) clarifying, (3) filtering, (4) advanced oxidation, and (5) sludge reducing. For graywater, the treatment system incorporates three general phases (or zones): (1) screening (2) filtering, and (3) advanced oxidation. Each train of the treatment system (blackwater and graywater) can operate as a stand-alone system or can be assimilated into an integrated treatment train for both graywater and blackwater. This system is particularly useful in today's restrictive regulatory environment.

14 Claims, 12 Drawing Sheets

U.S. PATENT DOCUMENTS

| | | |
|---|---|---|
| 5,256,299 A | 10/1993 | Wang et al. |
| 5,308,480 A | 5/1994 | Hinson et al. |
| 5,725,762 A * | 3/1998 | Beal et al. .................. 210/181 |
| 6,195,825 B1 | 3/2001 | Jones |
| 6,379,546 B1 * | 4/2002 | Braun ....................... 210/607 |
| 6,383,369 B2 * | 5/2002 | Elston ........................ 210/86 |
| 6,398,957 B1 * | 6/2002 | Mandt ....................... 210/605 |
| 6,811,705 B2 | 11/2004 | Puetter |
| 2003/0066799 A1 * | 4/2003 | Garcia et al. ................ 210/605 |

FOREIGN PATENT DOCUMENTS

| | | |
|---|---|---|
| WO | 93/24413 | 12/1993 |

* cited by examiner

|  | Capacity | | | Sludge Reduction | Stirred Reactor | Hydraulic Separator | Intermediate Tank | Finish Tank | Pre Filters | Ultra Filters |
|---|---|---|---|---|---|---|---|---|---|---|
|  | People | m³/day | gpm | | | | | | | |
| 24-inch Diameter Component Family | | | | | | | | | | |
|  | Component Size (gal) | | | 118 | 118 | 118 | 94 | 94 | * | * |
| Gray Water | 200 | 55 | 10 | 0 | 1 | 0 | 1 | 1 | 2 | 2 |
|  | 500 | 136 | 25 | 0 | 2 | 0 | 1 | 1 | 2 | 2 |
|  | 800 | 218 | 40 | 0 | 2 | 0 | 1 | 1 | 2 | 3 |
| Black Water | 300 | 55 | 10 | 1 | 2 | 1 | 1 | 1 | 0 | 1 |
| Orion | 50 | 8.1 | 1.5 | 0 | 1 | 1 | 0 | 0 | 0 | 0 |
|  | 150 | 27 | 5 | 0 | 1 | 1 | 0 | 0 | 0 | 1 |
| 36-inch Diameter Forward and Backfit Component Family | | | | | | | | | | |
|  | Component Size (gal) | | | 423 | 423 | 423 | 211 | 211 | * | * |
| Gray Water | 1,000 | 273 | 50 | 0 | 1 | 0 | 1 | 1 | 2 | 3 |
|  | 1,500 | 409 | 75 | 0 | 1 | 0 | 1 | 1 | 2 | 4 |
|  | 2,000 | 545 | 100 | 0 | 2 | 0 | 1 | 1 | 2 | 4 |
|  | 3,000 | 818 | 150 | 0 | 3 | 0 | 2 | 1 | 2 | 8 |
|  | 4,500 | 1,227 | 225 | 0 | 3 | 0 | 2 | 1 | 3 | 10 |
|  | 6,000 | 1,636 | 300 | 0 | 4 | 0 | 2 | 2 | 3 | 16 |
| Black Water | 1,000 | 109 | 20 | 1 | 2 | 1 | 1 | 1 | 0 | 1 |
|  | 1,500 | 164 | 30 | 2 | 2 | 2 | 1 | 1 | 0 | 2 |
|  | 2,000 | 218 | 40 | 2 | 2 | 2 | 1 | 1 | 0 | 2 |
|  | 3,000 | 328 | 60 | 3 | 2 | 3 | 2 | 2 | 0 | 3 |
|  | 4,500 | 492 | 90 | 4 | 3 | 4 | 2 | 2 | 0 | 4 |
|  | 6,000 | 656 | 120 | 4 | 6 | 4 | 4 | 2 | 0 | 5 |
| 72-inch Diameter Forward Fit Component Family | | | | | | | | | | |
|  | Component Size (gal) | | | 1,690 | 1,690 | 1,690 | 1,057 | 1,057 | * | * |
| Black Water | 3,000 | 328 | 60 | 1 | 1 | 1 | 1 | 1 | 0 | 3 |
|  | 4,500 | 492 | 90 | 1 | 1 | 1 | 1 | 1 | 0 | 4 |
|  | 6,000 | 492 | 120 | 1 | 1 | 1 | 1 | 1 | 0 | 5 |

FIG. 10

DUAL-TRAIN WASTEWATER RECLAMATION AND TREATMENT SYSTEM

CROSS-REFERENCE TO RELATED APPLICATIONS

The present application claims priority to United States provisional patent application entitled "Advanced Oxidation System For Wastewater Treatment," having Ser. No. 60/665,736, filed by inventor Randall Jones on Mar. 28, 2005, which is entirely incorporated herein by reference. The present application also claims priority to co-pending United States provisional patent application entitled "Dual-Train Wastewater Reclamation and Treatment System," having Ser. No. 60/777,520, filed by inventors Randall J. Jones and Stephen P. Markle on Feb. 27, 2006, which is also entirely incorporated herein by reference.

BACKGROUND OF THE INVENTION

1. Field of the Invention

The present invention relates generally to wastewater treatment systems, and more particularly wastewater treatment systems where holding large volumes of sludge for later disposal is difficult. As such, this invention particularly relates to waste water treatment for ships, off-shore structures and platforms other large transportation vehicles, mobile/portable treatment systems (i.e., military support, disaster relief, etc.), remote treatment systems (i.e. highway rest stops, campgrounds, etc.), industrial wastewater treatment, food processing, dairy and other light industrial wastewater treatment applications.

2. Discussion of the Related Art

Land-based wastewater treatment solutions tend to occupy relatively large spaces to effectuate wastewater treatment. Space, however, is a premium on transportation vehicles (like cruise ships), mobile treatment systems (such as used in military support), and remote treatment systems (like campgrounds), as well as other similarly situated treatment scenarios.

Ordinarily, wastewater systems combine blackwater and graywater prior to treatment. Blackwater and graywater, however, are very different in terms of chemical makeup (composition, viscosity), volume, perception by passengers and crew, and treatment under the law. For example, blackwater must be treated to a higher standard in most operating areas. Most ships are fitted with vacuum flush systems with blackwater pollutant concentrations much greater than those found in graywater. Shipboard water production, storage and management necessitates costly infrastructure.

Shipboard wastewater systems are typically based on biological treatment. While biological based systems can work, biological systems are complicated to operate, have a large footprint in terms of tankage and deck space, are susceptible to periodic chemical upsets, can be expensive to operate due to costs of chemicals, require provisioning of these chemicals, have long start-up times (order of days) and produce large amounts of sludge.

Finally, discharge of wastewater is regulated. Compliance with regulations can be difficult and may require holding volumes of wastewater for days to complete Biochemical Oxygen Demand (BOD) testing and other compliance testing. If the treated wastewater ultimately fails compliance testing, the process must be continued, which results in lost time and requires larger holding tanks.

Wastewater treatment systems have been disclosed in the following United States or foreign patents: U.S. Pat. No. 3,822,786 (Marschall), U.S. Pat. No. 3,945,918 (Kirk), U.S. Pat. No. 4,053,399 (Donnelly et al.), U.S. Pat. No. 4,072,613 (Alig), U.S. Pat. No. 4,156,648 U.S. Pat. No. (Kuepper), U.S. Pat. No. 4,197,200 (Alig), U.S. Pat. No. 4,214,887 (van Gelder), U.S. Pat. No. 4,233,152 (Hill et al.), U.S. Pat. No. 4,255,262 (O'Cheskey et al.), U.S. Pat. No. 4,961,857 (Ottengraf et al.), U.S. Pat. No. 5,053,140 (Hurst), U.S. Pat. No. 5,178,755 (LaCrosse), U.S. Pat. No. 5,180,499 (Hinson et al.), U.S. Pat. No. 5,256,299 (Wang et al.), U.S. Pat. No. 5,308,480 (Hinson et al.), U.S. Pat. No. 6,811,705 (Puetter), EPO 261822 (Garrett), WO 93/24413 (Hinson) and U.S. Pat. No. 6,195,825 (Jones). None of these references, however, disclose the aspects of the current invention.

What is needed is a wastewater treatment system that has a small footprint, produces dischargeable effluent minutes after startup, requires virtually no chemical additions, is simple to operate, minimizes sludge production from biological activity, is constructed of the most durable components, and produces a high quality effluent exceeding most stringent effluent requirements day-after-day. What is also needed is a wastewater treatment system that can treat the same volume of wastewater in a smaller space and/or in faster time than currently existing systems to reduce the space occupied by holding tanks and treatment equipment.

What is also needed is a system that can accurately predict treatment compliance results to enable more efficient and predictable compliance success.

SUMMARY OF THE INVENTION

The invention is summarized below only for purposes of introducing embodiments of the invention. The ultimate scope of the invention is to be limited only to the claims that follow the specification.

Generally, the present invention is incorporated in an integrated, split treatment system that treats blackwater for compliance and sludge reduction and treats graywater for reuse, blending and compliance (referred herein as the "dual-train water reclamation and treatment system" or "treatment system"). For blackwater, the treatment system incorporates five general phases (or zones): (1) screening, (2) clarifying, (3) filtering, (4) advanced oxidation, and (5) sludge reducing. For graywater, the treatment system incorporates three general phases (or zones): (1) screening (2) filtering, and (3) advanced oxidation. Each train of the treatment system (blackwater and graywater) can operate as a stand-alone system or can be assimilated into an integrated treatment train for both graywater and blackwater. This system is particularly useful in today's restrictive regulatory environment.

One advantage of the treatment system is the ability to treat blackwater differently from graywater. Reuse of graywater is becoming more socially acceptable; blackwater reuse is not. Moreover, reuse of reclaimed sewage also bears the risk to human health associated with equipment failure.

Another advantage of the treatment system is that it reduces the space needed for wastewater treatment, and space is a premium for mobile units like cruise ships and other aquatic vessels. The system is compact in size, simple in design, inexpensive to operate, built for long term reliable operation in the marine environment, hatchable, and modular in construction affording ease of tailoring with selection of correct number of standardized modules.

Another advantage of the water reclamation and treatment system is the use of turbidity, UV transmittance and ORP readings to predict final BOD levels for compliance or noncompliance in advance of the compliance test results to enable a more predictable and efficient treatment. In addition, it affords reach-back, real-time monitoring of effluent quality.

Another advantage of the water reclamation and treatment system is the ability to handle wastewater that lacks predictable levels of contamination and pH. Ferries or military vessels may wait for many hours, days, weeks, or even months between heavy loading events. This type of varied influent can greatly affect a biological based treatment system. Among other things, a varied influent causes a lengthy period of limited effectiveness while biological colonies reform. Unlike the biological systems in use in many of these applications, varied influent does not affect the water reclamation and treatment system. In this case, the treatment system immediately reacts and begins treatment without regard to effluent strength or pH. In addition, biological treatment systems typically require a fixed amount of time (1-2 weeks) to establish a viable colony for wastewater treatment. In this case, the water reclamation and treatment system begins treating wastewater immediately after system startup.

The description of the invention that follows, together with the accompanying drawings, should not be construed as limiting the invention to the example shown and described, because those skilled in the art to which this invention pertains will be able to devise other forms thereof within the ambit of the appended claims.

BRIEF DESCRIPTION OF THE DRAWINGS

FIG. 10 illustrates an embodiment of the modularity of the system 10.

DESCRIPTION OF PREFERRED EMBODIMENT

The descriptions below are merely illustrative of the presently preferred embodiments of the invention and no limitations are intended to the detail of construction or design herein shown other than as defined in the appended claims. In this specification, the term "graywater" refers to discarded liquid from sources such as deck drains, lavatories, showers, dishwashers, laundries, drinking fountains and potentially equipment cooling water. "Graywater" does not include industrial wastes, infectious wastes, human body wastes, and animal waste. In this specification, the term "blackwater" refers to sources such as wastes of human origin from water closets (toilets), urinals, and medical facilities transported by the ships soiled drain system (a/k/a sewage). It also includes animal wastes from spaces containing live animals. When graywater is combined with blackwater, the waste stream is characterized as blackwater. In this specification, the term "technical water" includes water for laundry, flushing water, cooling water, vehicle wash, etc. In this specification, the term "advanced oxidation" refers to a process that typically involves the generation and use of the hydroxyl free radical (OH⁻) as a strong oxidant to destroy compounds that cannot be oxidized by conventional oxidants such as oxygen, ozone, and chlorine.

General Design Overview

The water reclamation and treatment system 10 splits treatment into a blackwater treatment train 100 and a graywater treatment train 200. By splitting the treatment of blackwater and graywater, the treatment system can reclaim graywater for reuse. Reusing graywater offers several advantages. Among other things, reusing graywater (1) reduces fresh water making requirement/consumption, (2) reduces plant operating costs, (3) reduces tankage requirement (and ultimately the treatment footprint), (4) reduces ship propulsion plant costs by reduced ship displacement resulting from smaller tankage requirements, (5) protects the environment, and (6) reduces the volume of wastewater needing to undergo blackwater treatment.

The graywater and blackwater treatment trains differ in arrangement due to the unique differences of the influent treated. The principle difference is the location where filtration occurs. In graywater trains, filtration preferably occurs prior to advanced oxidation. In blackwater trains, filtration preferably depends on the level of total suspended solids (TSS). For blackwater with TSS less than 500 parts per million (PPM), filtration preferably occurs post-advanced oxidation. For blackwater with TSS greater than 500 parts per million (PPM), filtration preferably occurs prior to advanced oxidation.

Figure 1:
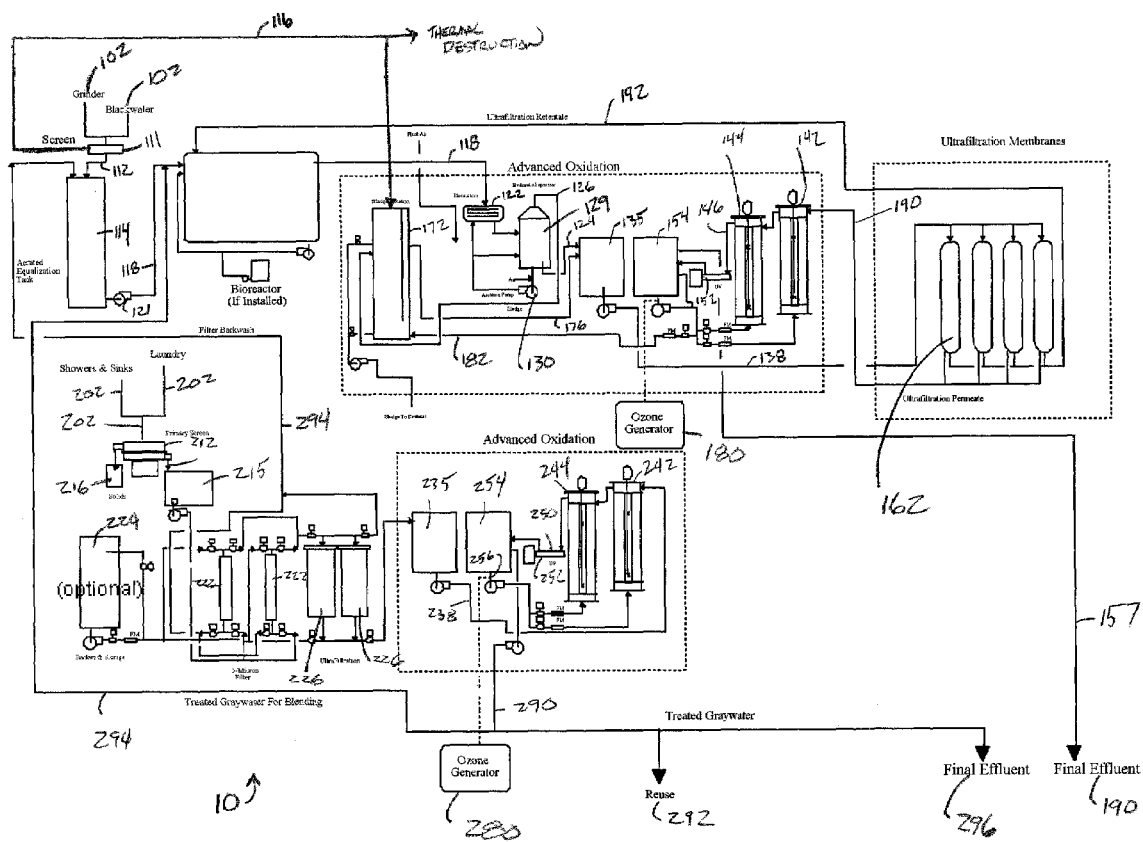
FIG. 1 illustrates an embodiment of an integrated water reclamation and treatment system 10.
Figure 11:
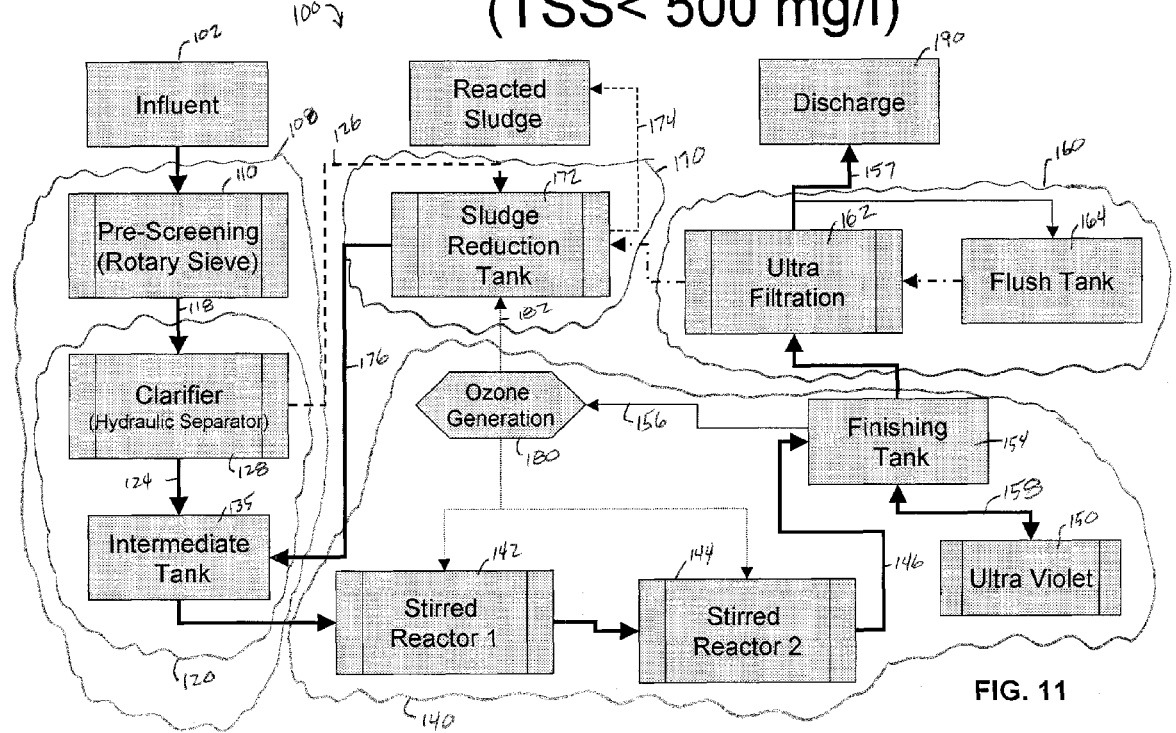
FIG. 11 is a flow chart that reflects an embodiment of an alternate blackwater treatment train 100.
Figure 12:
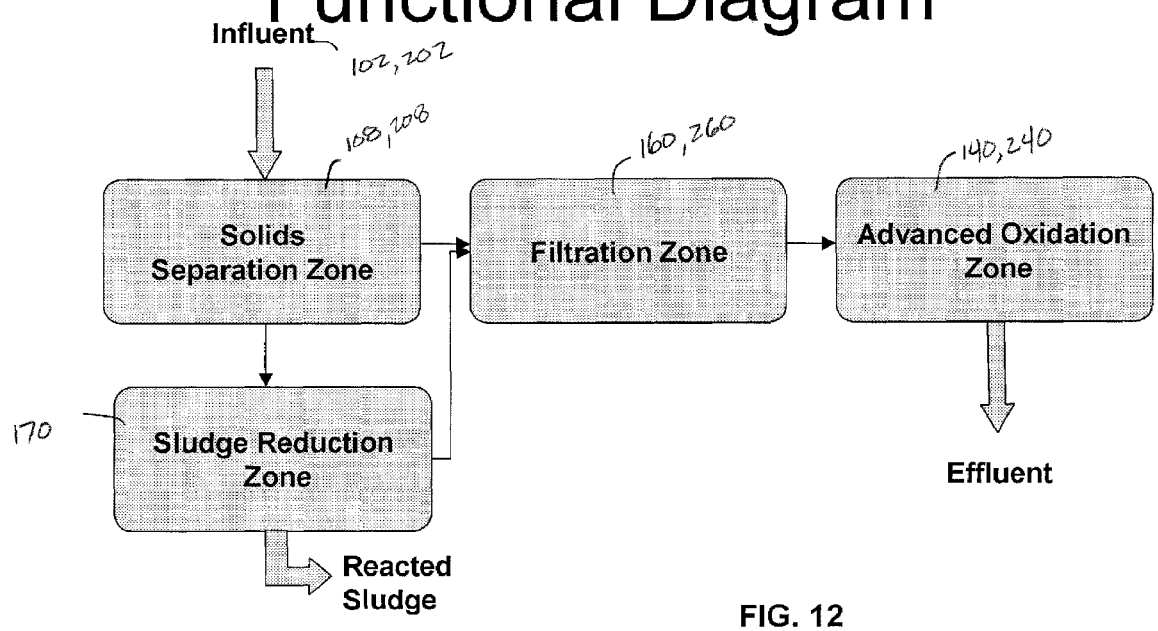
FIG. 12 is a flow chart that illustrates a functional diagram of flow zones of the system.

FIG. 1 provides an example embodiment of an integrated dual train system designed for shipboard use. Of course, the system shown in FIGS. 1-12 could be adapted for other uses (such as land-based uses) as well as other wastewater volumes and loading conditions. FIG. 12 illustrates the four principle zones of the water reclamation and treatment system 10. Whether as an integrated system or as a standalone system, the water reclamation and treatment system 10 comprises: a solids separation zone, a filtration zone, and an advanced oxidation zone, with the option of adding a sludge reduction zone.

Preferred Blackwater Treatment Train

The blackwater treatment train 100 can be used as a standalone system to treat wastewater. Alternatively, the blackwater treatment train 100 can be used as a retrofit to enhance existing systems. As illustrated in FIG. 1, the blackwater treatment train 100 can treat raw wastewater or wastewater first treated by an existing bioreactor.

Figure 2:
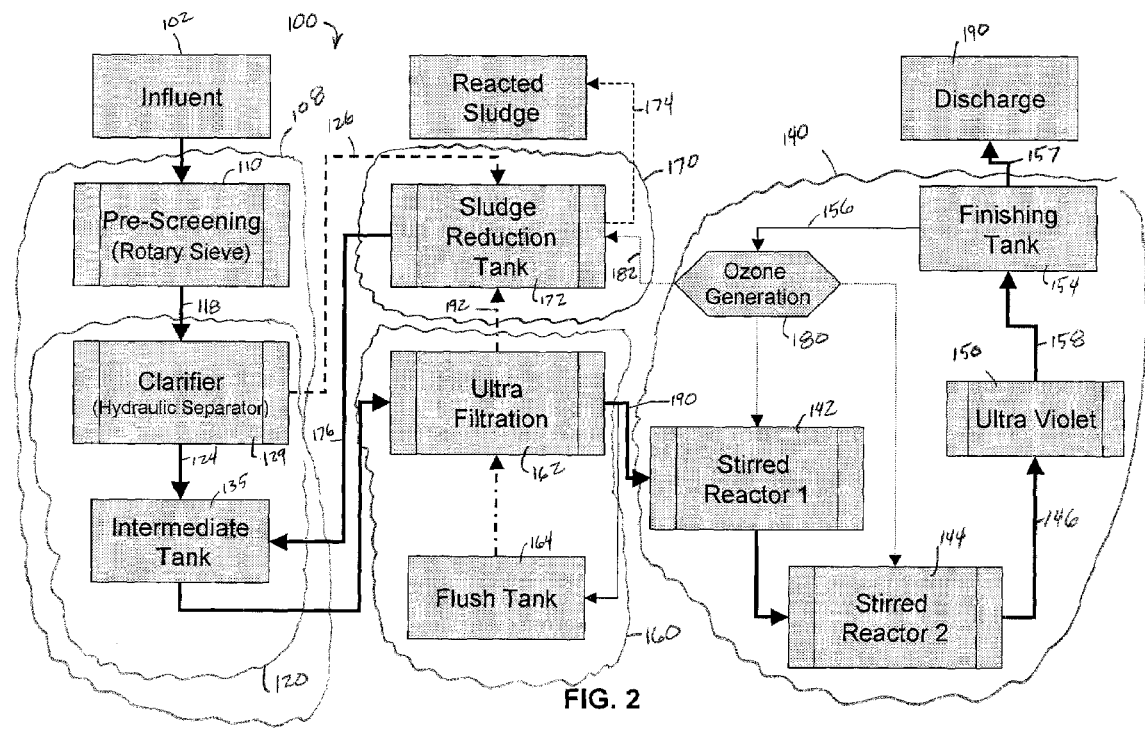
FIG. 2 is a flow chart that reflects an embodiment of a blackwater treatment train 100.

As shown in FIGS. 1 and 2, a first influent 102 enters the blackwater treatment train 100. Typically, this occurs directly from an installed blackwater collection system by way of a positive displacement pump. Alternatively, the first influent could enter from existing bioreactors. Initially, the first influent 102 enters a blackwater solids separation zone 108. While there are many ways to achieve a solids separation zone, it is preferred that the blackwater solids separation zone 108 further comprises a blackwater screening zone 110 and a clarifying zone 120.

The blackwater screening zone 110 performs initial solids separation. It is preferred that the blackwater screening zone 110 utilizes a 200-micron mesh rotary sieve 111 for initial solid separation. Screened effluent 112 can be held in an aerated equalization tank 114. Screened solids from the rotary sieve 111 are directed to either thermal destruction device or to the sludge reduction zone 170 (discussed below).

The first influent 102 comprises traditional blackwater sources, but could also include other sources. For example, in shipboard designs, it is preferred to include galley wastewater (sinks and grinders) as part of the first influent 102. In such cases, it is preferred that galley wastewater enter the blackwater treatment train 100 after first being directed through grease traps. Sources such as galley wastewater can be added directly to the aerated equalization tank 114 as shown in FIG. 1.

Figure 4:
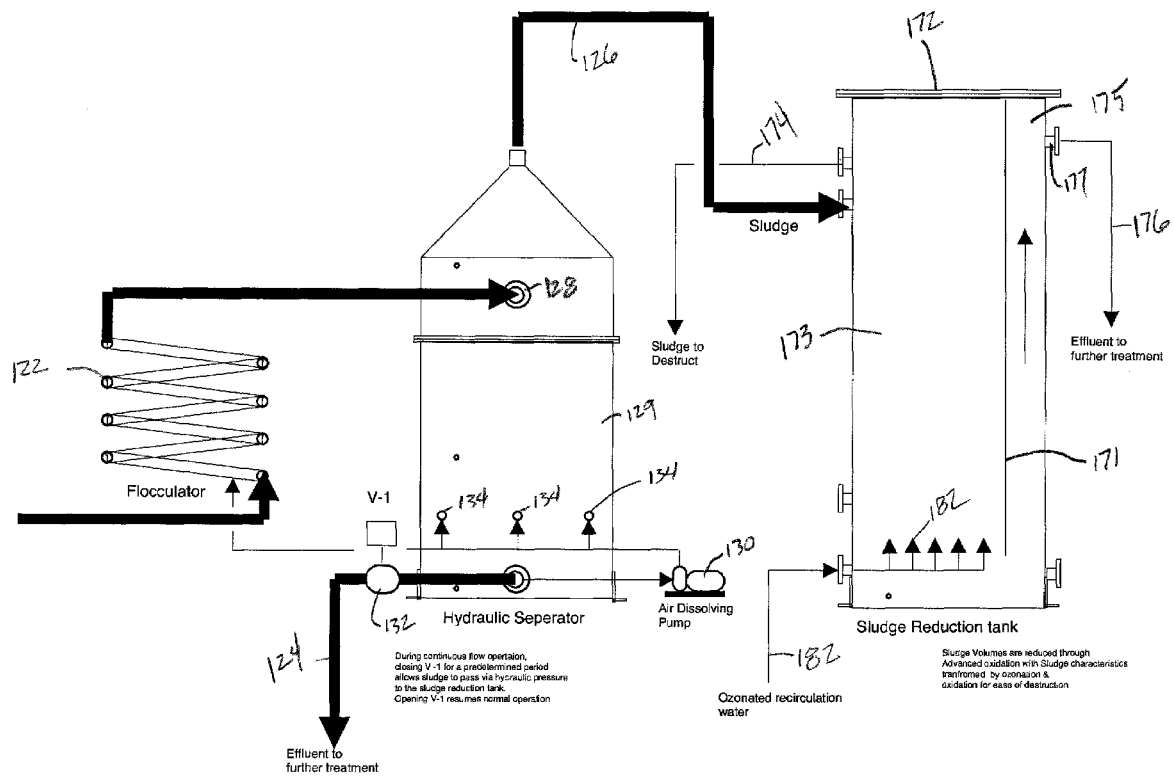
FIG. 4 illustrates an embodiment of a blackwater clarifying zone 120 and a sludge reduction zone 170.

Next, blackwater screening zone effluent 118 is pumped to a clarifying zone 120. A preferred embodiment of the clarifying zone 120 is shown in FIG. 4. It is preferred that the clarifying zone 120 include a macerating pump 121, a flocculator 122, a clarifier, an air dissolving pump 130 and a blackwater intermediate tank 135. The macerating pump 121 helps homogenize the incoming feed to an optimum particle size compatible with the clarifier. An example of a macerator pump 121 is Barnes model number DGV2042L. An example of an air-dissolving pump 130 is made by Nukini, model M25NPD-15Z. It is preferred that the air-dissolving pump 130 stream a small amount of air into the wastewater as the wastewater passes through the flocculator 122.

While many types of clarifiers are available, the preferred clarifier is a stainless steel hydraulic-lift dissolved air flotation device having a cone-shaped top, which is referred to in this specification as a hydraulic separator 129. Effluent from the flocculator 122 flows into the hydraulic separator 129 at the inlet 128. Air from the air-dissolving pump 130 is streamed through diffusers 134. When released from the pipe diffusers 134, dissolved air forms very fine bubbles that move upwards. This imparts an upward velocity to the fluid. As this air contacts solid material it tends to agglomerate onto its surface imparting a positive buoyant force. This combination of upward fluid velocity and positive buoyancy floats solids to the surface where they are removed at specific intervals to the sludge reduction tank 172. It is also preferred to add a solution of aluminum chlorohydrate by a dosing pump to attain an optimum concentration (roughly 30 ppm), which will assist flocculation and floatation of solids.

Closing outlet valve 132 permits liquid wastewater that continues to flow through inlet 128 to raise the liquid wastewater level in the hydraulic separator 129. Ultimately, the liquid wastewater level will rise to the point that it force the separated sludge 126 (for this specification, the term "separated sludge" also includes water from the top of the hydraulic separator 129) into the inverted cone region at the top of the hydraulic separator 129. When the level is sufficiently high, separated sludge 126 (which has formed a floating blanket) is directed through the outfall pipe located at the top of the hydraulic separator 129 into the sludge reduction tank 172. It is preferred to keep the separated sludge in a liquid, flowable state so that it will flow without need for mechanical means. With a flowable separated sludge and having the top of the hydraulic separator 129 higher than the sludge reduction tank 172 inlet and normal operating level, sludge flows by gravity into the sludge reduction tank 172.

The sludge reduction tank 172 is segmented into two regions by a baffle plate 171. The baffle is oriented to form a barrier at the top of the tank and open at the bottom allowing communication between the two tank regions. One side of the baffle plate 171 forms a sludge reduction region 173 and the other side of the baffle plate 171 forms an uptake region 175. Separated sludge 126 from the hydraulic separator 129 enters the sludge reduction region 173 of the sludge reduction tank 172 near the top of the vessel. Separated sludge 126, so introduced, will retain its buoyancy and tend to rise to the top of the tank; while liquid is displaced downward. Clarified water, which can pass under the baffle plate 171 collects in the uptake region 175 before flowing by gravity into the blackwater intermediate tank 135.

Ozonated finishing tank effluent 182 can be introduced into the sludge reduction tank 172, preferably in the sludge reduction region 173 in sufficient quantity to oxidize the odoriferous material. A simple smell test works here. The sludge reduction tank 172 treats sludge through advanced oxidation, with sludge characteristics transformed by ozonation and oxidation. This substantially reduces sludge volume by oxidation to carbon dioxide gas, water and other materials. In addition, the sludge reduction tank 172 promotes solid and liquid separation. This step also further clarifies the sludge mixture, forcing clarified water downward in the device, around the baffle and into the clarified water uptake region 175. As additional sludge enters the sludge reduction tank 172 from the hydraulic separator 129, an equal amount of sludge reduction tank 172 clarified water flows under the baffle and into the uptake region 175. When the water level reaches the uptake outfall 177, it is directed to the blackwater intermediate tank 135.

The preferred sludge reduction tank 172 is cylindrical in shape. For separated sludge 126 flow rates of 0.5 gpm, the preferred sludge reduction tank would be approximately 8 feet tall and 3 feet in diameter, having a total ozonated volume of approximately 320 gallons, and providing a total retention time of 10 hours. In addition, the preferred baffle plate 171 is a flat plate that is positioned within the cylindrical tank as a chord, running from inside wall to inside wall of the sludge reduction tank 172.

Reacted sludge 174 is directed to an onboard disposal system for thermal destruction or held for overboard discharge at-sea or pumped ashore. Unlike most, if not all, sludge burning incinerators in use today, which suffer from odor problems from incineration of odiferous sludge from bioreactors, the sludge reduction zone 170 removes virtually all odors from the reacted sludge 174, making it suitable for destruction by thermal devices.

When the outlet valve 132 is open, clarified water 124 flows into the blackwater intermediate tank 135. Likewise sludge reduction tank 172 clarified water 176 from the sludge reduction zone 170 also flows into the blackwater intermediate tank 135 and mixes with the clarified water 124.

Clarification zone effluent 138 proceeds to a blackwater filtration zone 160. It is preferred that the blackwater filtration zone 160 comprises blackwater ultrafilters 162 and a blackwater flush tank 164. It is preferred that the blackwater ultrafilters 162 be pressure fed external plate and frame ultrafiltration membranes, such as the Pleiade Series manufactured by Novasep Orelis. This membrane system has approximately 753 square feet (70 square meters) of surface area/module, and can process up to 26.5 gallons-per-minute (6 $m^3$/hr) per module. System capacity may be increased by adding additional modules. The blackwater ultrafilters 162 should be periodically flushed with water produced by the blackwater ultrafilters 162 and stored in the blackwater flush tank 164.

Blackwater retentate 192, comprised of solids and other material that did not pass through the blackwater ultrafilters 162, is directed to the sludge reduction zone 170 for treatment, or bioreactor if installed. Blackwater permeate (i.e., effluent from the filters) 190 is directed to a blackwater advanced oxidation zone 140.

It is preferred that the blackwater advanced oxidation zone 140 comprises an ozone generator 180, at least one, but preferably two blackwater stirred reactors 142, 144, a blackwater disinfecting zone 150 and a finishing tank 154. Prior to entering a stirred reactor, it is preferred to infuse blackwater permeate 190 with ozone. Ozone can be produced in a blackwater ozone generation zone 180 from ship service oil free compressed air. Many different ozone generators could work. For example, the 240-g/hr ozone generator sold by Pacific Ozone, Model R-SGA642, is preferred for treating 30 gpm flows of blackwater. The ozone can be dissolved into a pressurized stream of blackwater finishing tank effluent 156 for circulation to the blackwater stirred reactors 142, 144 and the sludge reduction tank 172.

Figure 5:
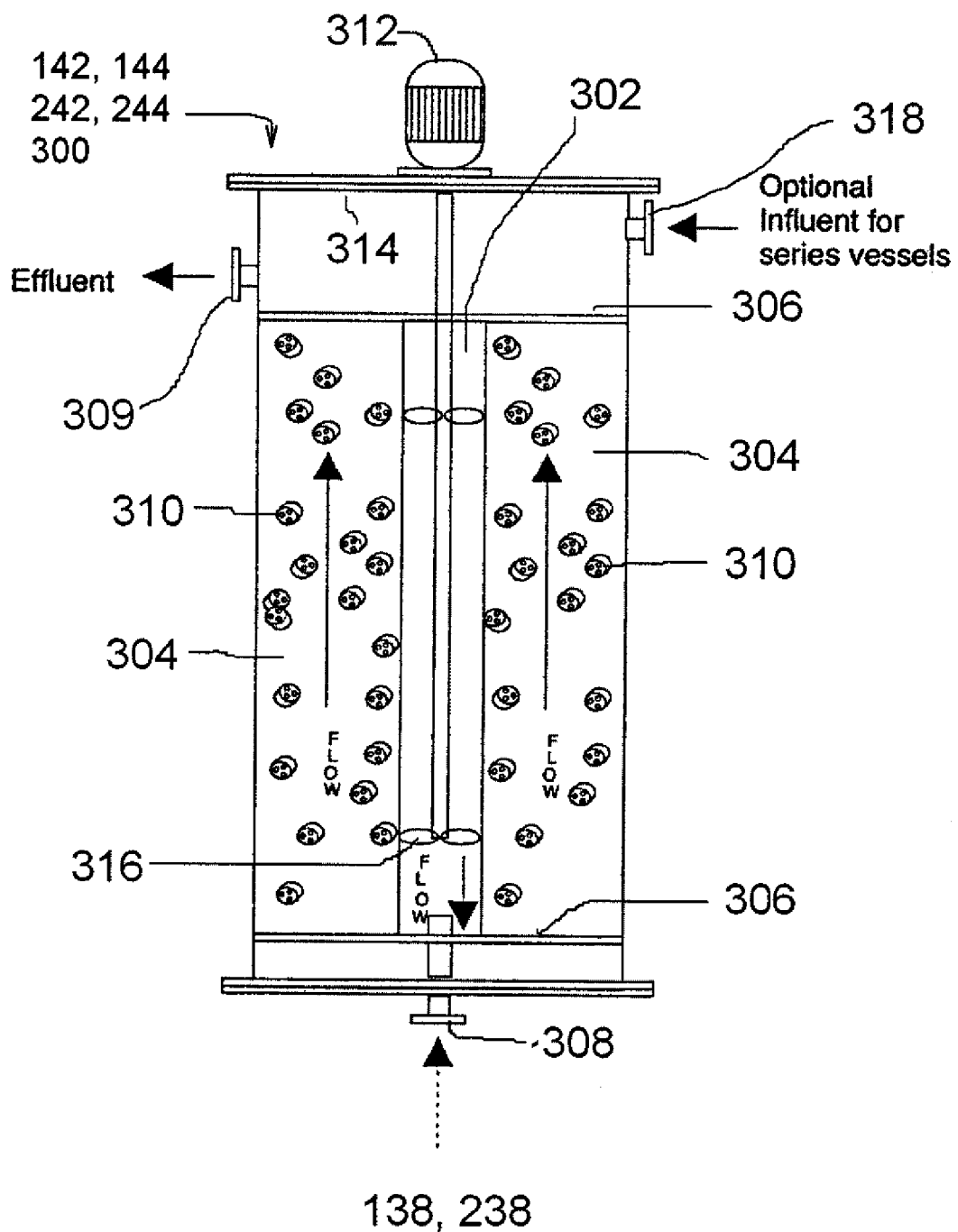
FIG. 5 illustrates an embodiment of a stirred reactor 300.

The preferred design of the blackwater stirred reactors 142, 144 is shown in FIG. 5. It is preferred to have blackwater stirred reactors 142, 144 arranged in series. Within each blackwater stirred reactor 142, 144, neutrally buoyant media 310 provide sufficient surface area for the interaction and oxidation of dissolved ozone and soluble and insoluble organic material. For treating 30 gpm flows, it is preferred to size each blackwater stirred reactor 142, 144 to provide at least 11 minutes of residence time for the ozone oxidation reaction to occur.

Next, blackwater stirred reactor effluent 146 is directed to a blackwater disinfection zone 150 and treated with ultraviolet light. Ultraviolet radiation is advantageous because it damages the genetic structure of bacteria, viruses, and parasites, making them incapable of reproducing and/or killing them. In addition, ultraviolet radiation removes ozone. It is preferred that the blackwater disinfection zone 150 comprises a UV unit 152. It is preferred to use a medium pressure, high intensity UV unit 152 that produces polychromatic light for destruction of residual organic material, and disinfection. An example of such a unit is the Hyde Marine Model QMD100B1. The UV unit 152 can feature an automatic cleaning wiper, which can be controlled by the control system 450. The UV unit 152 also transforms any residual ozone into fast reacting species, such as hydrogen peroxide and hydroxyl radicals further consuming any residual organic carbon based material. In addition, the destruction of residual ozone through this process allows for post-membrane filtration with ultra filtration where such filters would not ordinarily tolerate ozone-enriched water without damage. UV treated water is then directed to the finishing tank 154.

Ozone infused water in the finishing tank 154 is recirculated back to the stirred reactors and UV unit until the level in the finishing tank 154 reaches a predetermined level. Blackwater finishing tank effluent 157 is then either pumped directly overboard if compliant, or pumped to onboard ship storage tanks for eventual discharge.

Blackwater finishing tank effluent 157 is typically colorless and odorless since ozone reaction with wastewater removes color and odors. This phenomenon is unique and important since most other technologies used for treating wastewater such as bioreactors or membrane-bioreactors do not consistently produce effluent of this visual and olfactory quality.

The use of gravity separation after grinding in this application is unique owing to the sludge reduction capabilities of the sludge holding and sludge reduction tank 172. This allows the system to be operated in remote environments where sludge limitations and disposal are major obstacles to system operation and standard treatment methods would be undesirable in part due to quantities of sludge produced Alternate Embodiment of Blackwater Treatment Train Alternatively, the blackwater filtration zone 160 could be moved from its location prior to the blackwater advanced oxidation zone 140 and after the clarification zone 120 to after the blackwater stirred reaction zone 140 as shown in FIG. 11. This alternate blackwater treatment train is preferred when the total suspended solids (TSS) is less than 500 parts per million.

Preferred Graywater Treatment Train

The graywater treatment train 200 can be used as a standalone system to treat and reuse graywater or discharge all or part of the treated graywater. It is preferred to use the same component design for any graywater treatment train component that has a counterpart in the blackwater treatment train and vice versa. The blackwater treatment train 100 and graywater treatment train 200, however, are separate treatment trains and wastewater is not commingled between the two trains other than where expressly stated. In other words, the two treatment trains share only component design; they do not physically share components.

Figure 3:
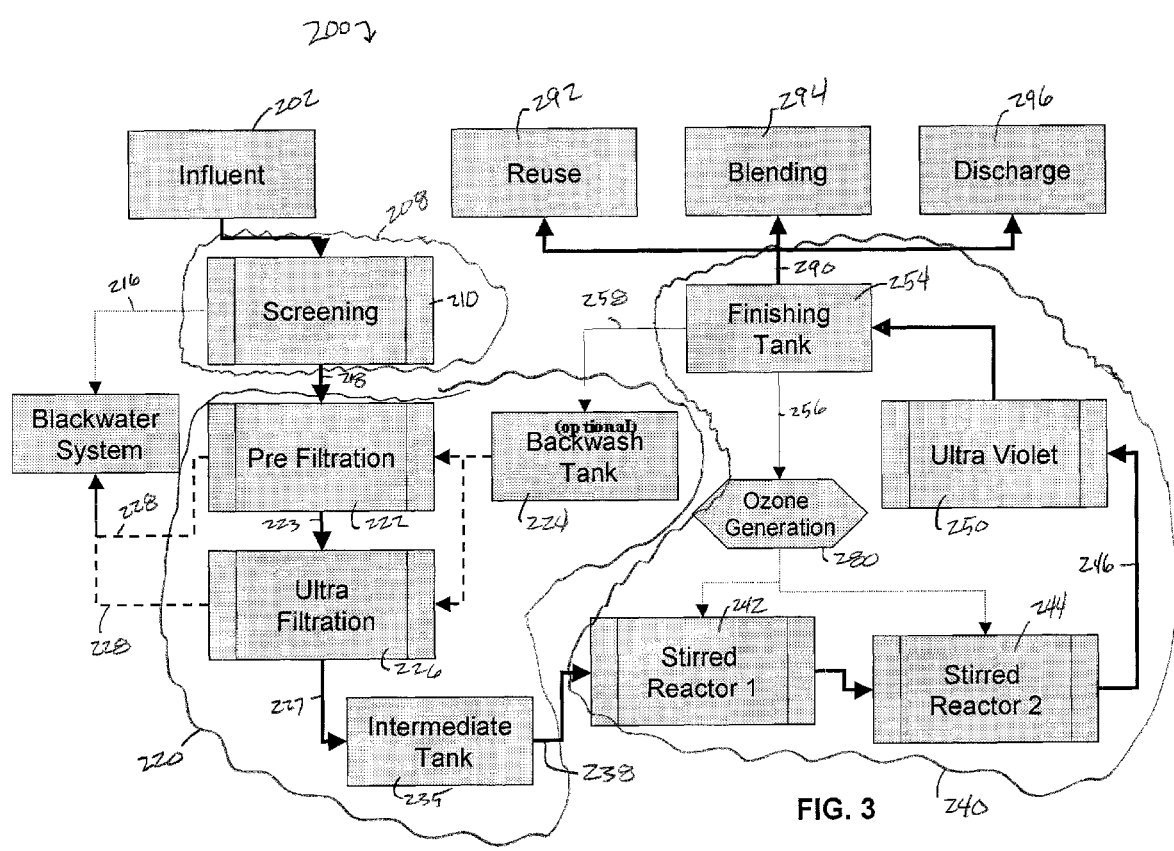
FIG. 3 a flow chart that reflects an embodiment of a graywater treatment train 200.

As shown in FIGS. 1 and 3, a second influent 202 enters the graywater treatment train 200. Typically, the second influent 202 first enters a graywater solids separation zone 208. While there are many ways to achieve a solids separation zone, it is preferred to employ a screening zone 210 after being pumped from a graywater holding tank (not shown). Preferably, the graywater screening zone 210 includes a resiliently mounted shaker screen 212 where separation of larger material occurs. The screen is mounted on an equalization tank 215. Screened solids 216 collected from the graywater screening zone 210 are directed to the sludge reduction zone 170.

Next, the graywater screening zone effluent 218 is directed from equalization tank 215 to a graywater filtration zone 220. It is preferred that the graywater filtration zone 220 include pre-filters 222 graywater ultrafilters 226, a backwash tank 224 and a graywater intermediate tank 235.

The pre-filters 222 are preferably skid mounted, stainless steel vessels. The pre-filters 222 house polyethylene filter sleeves that will remove particulate material, reducing suspended solids and oil/grease in the graywater stream. The redundant nature of the configuration ensures an uninterrupted flow of filtered water to the graywater ultrafilters 226. The system self-cleans using its own filtered water. In the preferred embodiment, the pre-filters 222 are sized to remove particulate larger than 5 micron in size, filters with this capability are available from Wastewater Resources, Inc, model number AQM 30.

Next, pre-filter effluent 223 is directed to the graywater ultrafilters 222. The graywater ultrafilters 222 preferably use 20-nanometer ceramic membranes such as those manufactured by the Novasep Orelis company of Lyon, France. When using ceramic membranes, surface wash water is preferably ozonated and it is preferred not to use chlorine. The preferred source of ozonated surface wash water is from the graywater finishing tank 254. A pH neutralization chemical is preferred to adjust the pH of the reclaim water to a pH of 7.5. For a 25-gpm design, it is expected that between 50 and 80 gallons per month of pH neutralizer will be required, volume is dependent upon pH of influent graywater.

Alternatively, the graywater filters 222 can use 20-nanometer polysulfone synthetic membranes, such as those manufactured by Wastewater Resources, Inc., model number PC1140. When using polysulfone synthetic membranes (the alternative ultrafilter embodiment), it is preferred to add chlorine to the backwash water for disinfection of the modules. If polysulfone synthetic membranes are used, it is preferred to add a backwash tank 224 as shown in FIG. 3. Chlorine use for the backwash tank 224 should not exceed 20 gallons per month for a 25-gpm system. A pH neutralization chemical is also preferred hereto adjust the pH of the reclaim water to a pH of 7.5. It is expected that between 50 and 80 gallons per month of pH neutralizer will be required, volume is dependent upon pH of influent graywater.

For a 25-gpm design using polysulfone synthetic membranes (the alternative ultrafilter embodiment), a 94-gallon backwash tank 224 constructed from ¼-inch polypropylene, such as the one manufactured by Navalis Environmental Systems, LLC, model number TK24-007-01, is preferred. For a 25-gpm design using polysulfone synthetic membranes (the alternative ultrafilter embodiment), the membranes are each 12-in in diameter and 36-in in height with 1,140 $ft^2$ of surface area. The process is designed to filter particles in the range of 0.02 to 0.04 microns at up to 130 degrees F. with particulate loading not to exceed 750 ppm. This will allow for backwashing at 24 to 30 minute intervals for two minutes. When using polysulfone synthetic membranes (the alternative ultrafilter embodiment), water for the backwash tank 224 is preferred from the graywater finishing tank 254.

Graywater filter permeate 227 is collected in the graywater intermediate tank 235. Graywater intermediate tank effluent 238 proceeds to a graywater advanced oxidation zone 240. It is preferred that the graywater advanced oxidation zone 240 comprise an ozone generator 280, at least one, but preferably two graywater stirred reactors 242, 244, a graywater disinfecting zone 250 and a graywater finishing tank 254. Prior to entering a graywater stirred reactor, it is preferred to infuse intermediate tank effluent 238 with ozone. Ozone can be produced in a graywater ozone generation zone 280 from ship service oil free compressed air. Many different ozone generators could work. For example, the 120-g/hr ozone generator sold by Pacific Ozone, Model R-SGA442, is preferred for treating 100 gpm flows of graywater. The ozone can be dissolved into a pressurized stream of graywater finishing tank effluent 256 for circulation to the graywater stirred reactors 240, 242. A second graywater finishing tank effluent 258 can be directed to the graywater backwash tank 224 in the alternative ultrafilter embodiment that uses polysulfone ultrafilters.

The preferred design of the graywater stirred reactors 242, 244 is shown in FIG. 5. It is preferred to have graywater stirred reactors 242, 244 arranged in series. Within each graywater stirred reactor 242, 244, neutrally buoyant media 310 provide sufficient surface area for the interaction and oxidation of dissolved ozone and soluble and insoluble organic material. It is preferred to size each graywater stirred reactor 242, 244 to provide at least 5 minutes of residence time for the ozone oxidation reaction to occur.

Stirred reactor effluent 246 proceeds to a graywater disinfection zone 250 and disinfected with ultraviolet light. It is preferred that the graywater disinfection zone 250 comprises a UV unit 252. It is also preferred to use a medium pressure, high intensity UV unit 252 that produces polychromatic light for destruction of residual organic material, and disinfection. An example of such a unit is the Hyde Marine QMD100B1. The UV unit 252 can feature an automatic cleaning wiper (as controlled by the control system 450). The UV unit 252 also transforms any residual ozone into fast reacting species, such as hydrogen peroxide and hydroxyl radicals further consuming any residual carbon based material.

Graywater finishing tank effluent 290 may be reused 292 (e.g., directed back to laundry feed tanks for reuse as reclaimed technical water), blended 294 with graywater screening zone effluent 218, or discharged 296 where regulations permit. The graywater finishing tank 254 also serves as source water of backwash for the backwash tank 224.

Graywater retentate 228 from the graywater filtration zone 220 can be directed to the blackwater sludge reduction zone 170. Alternatively, graywater retentate 228 could be directed to a ships graywater transfer system (not shown).

Preferred Stirred Reactor

FIG. 5 illustrates the preferred stirred reactor 300. It is preferred to use the stirred reactor 300 for the blackwater stirred reactors 142, 144 and the graywater stirred reactors 242, 244. Referring to FIG. 5, the stirred reactor 300 comprises two cylindrically shaped chambers: a cylindrical acceleration chamber 302 and a fluidized media chamber 304. The two chambers are mounted coaxially with respect to each other (i.e., one inside the other). Two washer-shaped perforated plates 306 on either end cap the fluidized media chamber 304. One perforated plate is mounted near the top of the stirred reactor 300 and the other near the bottom. The volume between the perforated plates 306 houses fluidized media 310. These upper and lower perforated plates 306 hold the fluidized media 310 in place and away from inlet and outlet ports. It is preferred that the perforations be sized to allow maximum flow while retaining the fluidized media 310 between perforated plates 306.

The cylindrical acceleration chamber 302 is smaller in cross section and mounted between the perforated plates 306. The preferred stirred reactor 300 has inlet ports 308 and outlet ports 309 for admitting and exhausting the liquid. At the top of the stirred reactor 300, a mixer 312 with a shaft 314 containing multiple blades 316 passes down though the cylindrical acceleration chamber 302. The mixer 312 moves fluid in the cylindrical acceleration chamber 302 down and out to the fluidized media chamber 304 through the bottom perforated plate 306. Ozone enriched fluids react with dissolved ozone and tiny, outgassed ozone bubbles which have formed on the fluidized bed, walls of the chamber, and float freely within the chamber. This enhanced oxidation reactor allows for advanced treatment in a small space.

The preferred stirred reactor 300 is for a 100-gpm graywater or 30-gpm blackwater treatment train is constructed from 316 stainless steel, approximately 3 feet diameter, 8 feet tall, having a fluidized media chamber 304 volume of 282 gallons and a combined inside/outside chamber volume of 423 gallons. Thus, it is preferred that the fluidized media chamber 304 be about ⅔ of the size of the combined inside/outside chamber volume.

The preferred stirred reactor 300 is for a 25-gpm graywater and 10 gpm blackwater treatment train is constructed from 316 stainless steel, approximately 2 feet diameter, 5 feet tall, having a fluidized media chamber 304 volume of 79 gallons and a combined inside/outside chamber volume of 118 gallons.

The stirred reactor 300 can be used alone, in series or in parallel. FIG. 1 illustrates two stirred reactors 300 connected in series. When connected in series, the outlet port 309 of one stirred reactor 300 can be connected to the series inlet port 308 if the second stirred reactor 300.

The design of the advanced ozone reactor chambers and their incorporation of fluidized media held in place by perforated plates allows the process to reach maximum oxidation efficiency in order to meet modern standards. Earlier use of ozone in other designs limits the effectiveness of the process and may fail to meet these more stringent standards.

System Modularity

The treatment system 10 is expandable by design. It is preferred to construct a treatment system 10 from a standard family of 24-inch and 36-inch diameter tanks. The 24 and 36 inch families are directed to retrofit design applications. In addition, FIG. 10 discloses an embodiment of a forward-fit blackwater component design. In a forward-fit design (i.e., new construction projects), larger diameter tanks can be more easily assimilated into the ship or other structure than in the typical retrofit situation. In this way, system treatment capacity is a function of the number of modular system components selected. Specific advantages of this design flexibility include:

1. System capacity is related to residence time in the reactor vessels. The 100-gpm graywater treatment system shares common stirred reactor, tank, pumps and system component (with exception of ultrafiltration units) designs and materials with the 30-gpm blackwater treatment system.
2. System components are mounted on either 28-inch or 40-inch stainless steel squares that afford ease of mounting on ship foundations.
3. System blocks can be arranged in a variety of configurations to optimally use the space available, from a very compact square to open linear based on available footprint.
4. Ease of rigging to the designated system compartment:
   24-inch diameter system components fit through a 28"×28" square or 40" (1 meter) round opening
   36-inch diameter system components fit through a 40"×40" square or 57"(1.5 meter) round opening
5. The arrangement enables design for easy access to areas requiring routine maintenance.
6. The system is designed for growth. The modular nature of its components enables ease of expansion. For example, the capacity of the 25-gpm Graywater System could easily be increased by addition of a filter module, and if necessary an additional reactor.

An illustration of the building block nature of system capacity and inherent flexibility are provided in FIGS. 6-10.

Example: 25 gpm Graywater Embodiment

As previously noted, the water reclamation and treatment system 10 can operate as a stand-alone system or as part or a more comprehensive treatment train. The following sections describe examples of how the treatment system 10 could be incorporated into different treatment trains. These examples should not be construed, however, as limiting the invention to the example shown and described, because those skilled in the art to which this invention pertains will be able to devise other forms thereof within the scope of the disclosure set forth herein.

Figure 8:
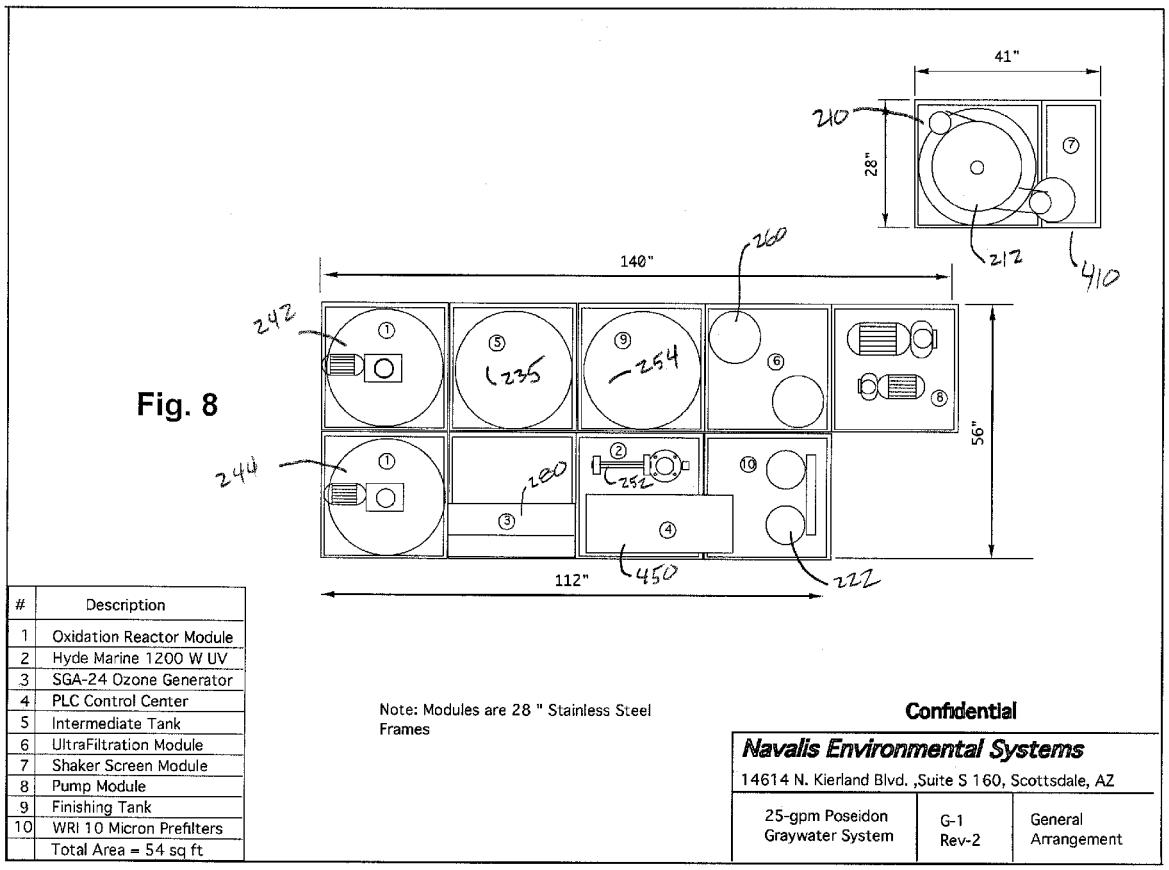
FIG. 8 illustrates an embodiment footprint/plan for a 25-gpm graywater treatment train 200.

While a treatment system can be designed to meet existing conditions and need, the following section summarizes an embodiment of the treatment system sized to treat 25-gpm of graywater. A plan/footprint of this embodiment is shown in FIG. 8. Referring now to FIG. 8, a first modular group 400 and a second modular group 410 of modules house the treatment system. The first modular group 400 comprises two rows of five modules, where each module is 28-inches square and constructed from stainless steel. The second modular group 410 comprises one module 28-inches by 41-inches. The modular sizing shown in this embodiment will permit a total footprint of 54 square feet.

Figure 6:
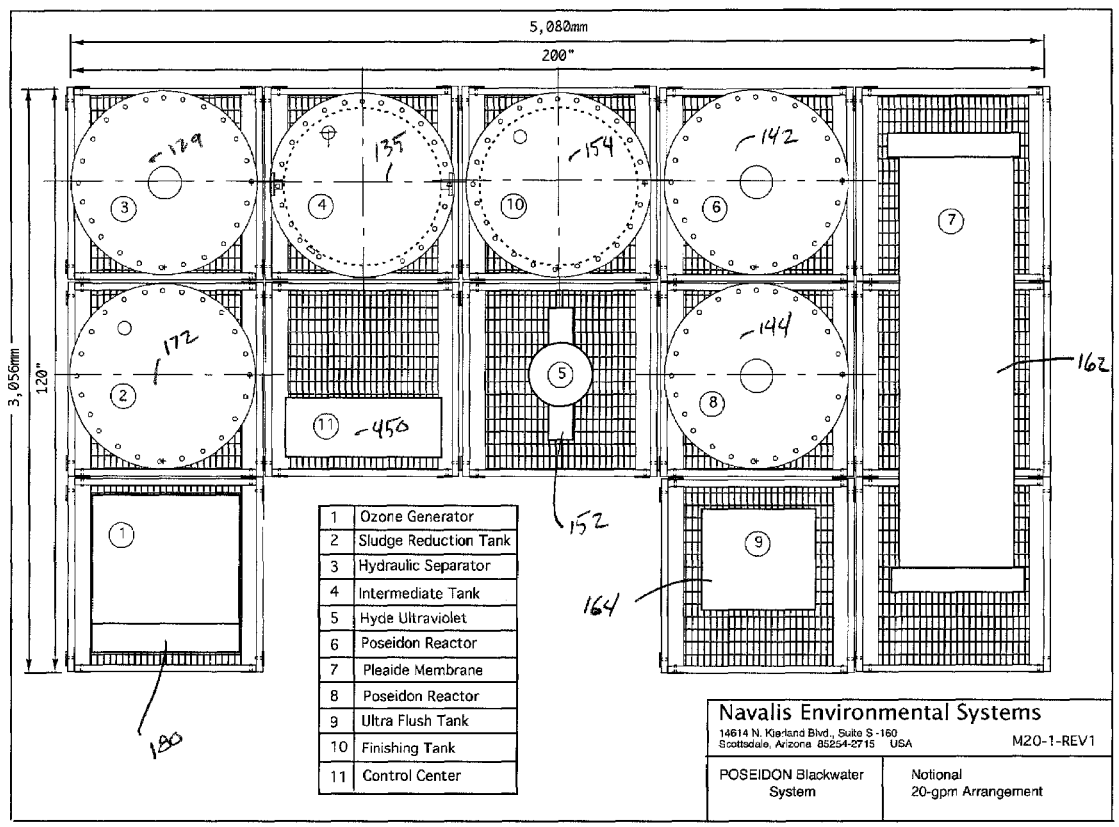
FIG. 6 illustrates an embodiment footprint/plan for a 20-gpm blackwater treatment train 100.
Figure 7:
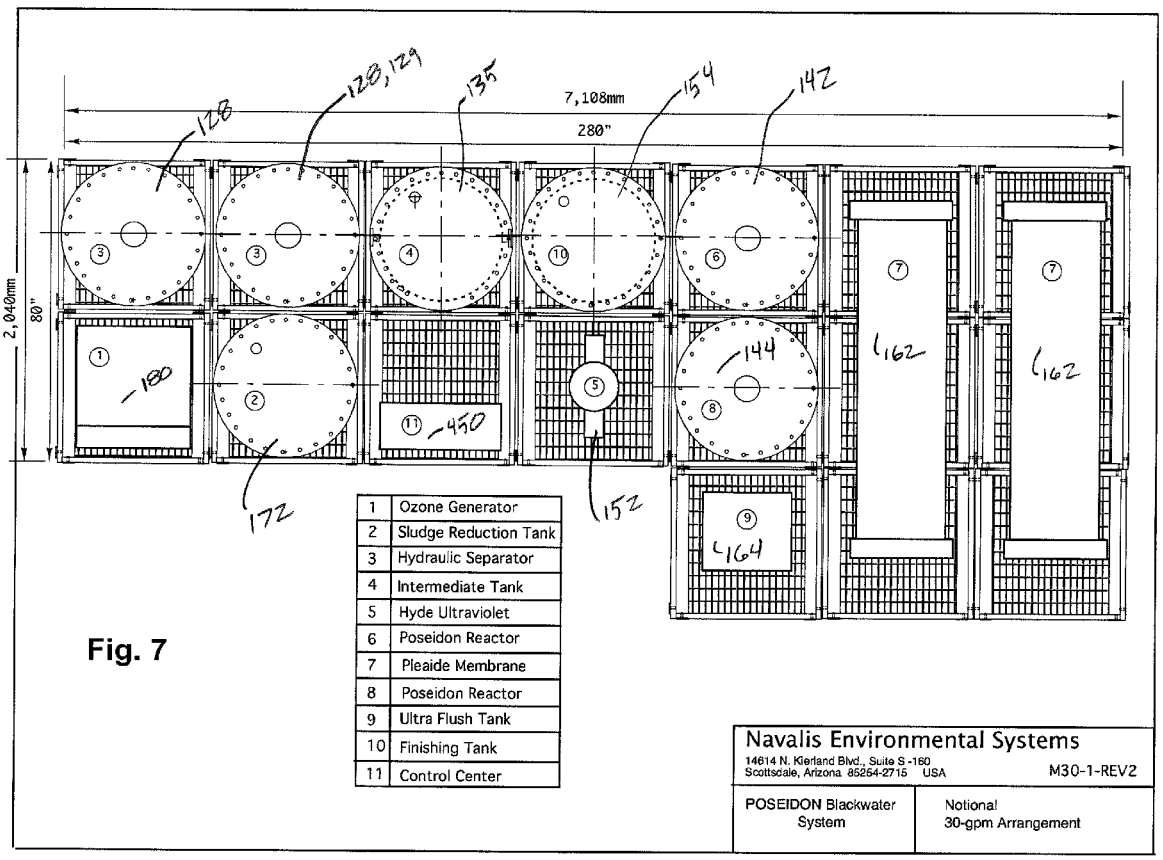
FIG. 7 illustrates an embodiment footprint/plan for a 30-gpm blackwater treatment train 100.
Figure 9:
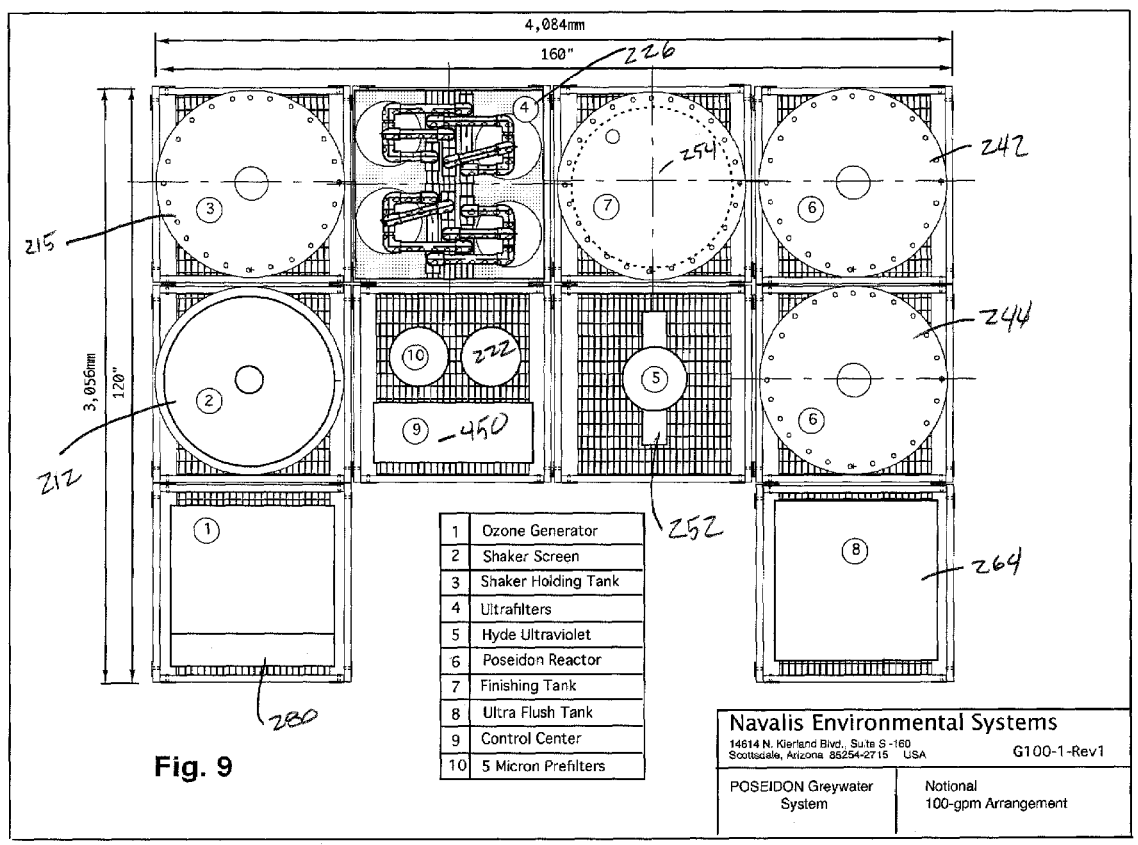
FIG. 9 illustrates an embodiment footprint/plan for a 100-gpm graywater treatment train 200.

This modular design can be arranged in a variety of configurations to optimally use the space available. The modular design enables ease of expansion. For example, the capacity of the 25-gpm system could easily be increased by addition of a filter module, and if necessary an additional stirred reactor. System components are mounted on 28-inch stainless steel squares that afford ease of mounting on ships foundations, and make a variety of configurations possible; from a very compact square to open linear. For ship use, each component preferably fits through a 28-inch opening for ease of rigging to the designated system compartment. Further, the arrangement allows for easy access to areas requiring routine maintenance. Other modular embodiments are shown in FIGS. 6, 7, and 9.

It is preferred that the treatment system be fully automated and capable of remote control. It is preferred to use a control system 450, such as an Allen Bradley Programmable Logic Controller (PLC). The control system 450 can interface with most ship interior communication and control systems providing system status where desired throughout the ship. The control system 450 can alert operational staff to issues requiring intervention. The control system 450 can also be configured for reach-back monitoring of system performance off ship through the addition of networking components such as modems or ethernet connections. This permits operators of the system to monitor and solve operational issues as they arise.

In this example, treatment system components are preferably fabricated from 316 Stainless Steel and should be impervious to ozone. System tanks are preferably constructed from ¼-inch 316 Stainless Steel. Internal piping should be press fit 316 Stainless Steel or CPVC for the filter assembly only.

In this example, the graywater screening zone 210 uses a shaker screen manufactured by Midwestern Industries, model Gyra-Vib MR 24 and a shaker tank manufactured by Navalis Environmental Systems, LLC ("Navalis"), model number TK24-008-01; graywater ultrafilters 222 manufactured by Wastewater Resources, Inc., model number PC1140; graywater intermediate tank 235 manufactured by Navalis, model number TK24-001-01; graywater stirred reactors 242, 244 manufactured by Navalis, model number TK24-003-01; UV unit 252 manufactured by Hyde Marine, model number QMD100B1; a graywater finishing tank manufactured by Navalis, model number TK24-002-01; graywater backwash tank 224 manufactured by Navalis, model number TK24-007-01; ozone generator 280 manufactured by Pacific Ozone, model number SGA 24 (60 g/hr); control system 450 manufactured by Navalis model number CP-GW-25; 30-gpm Process Pump manufactured by Nikuni, model number M40NP; 50-gpm Transfer Pump manufactured by Gould model number 11ASH262DO; 50-gpm Filter Charging Pump manufactured by Gould, model number 4SH2E2CO; 100-gpm Filter Backwash Pump manufactured by Gould, model number 8SH2H2CO; Ambient Ozone Monitor/Alarm/Shutdown manufactured by IN USA, model number IN-2000-L2-LC.

It has been found that during normal operation of the treatment system, a system sized to handle 25-gpm of graywater operated in the order of 18 hours a day can reclaim 100 m3/day of graywater for reuse.

Elevated ORP Reading and Relationship to Turbidity

The water reclamation and treatment system 10 will produce an effluent with elevated ORP (oxygen reduction potential) and a lowered turbidity when in regulatory compliance as a by-product of its design. The recirculation of final effluent through a stirred reactor 300 and subsequently UV light in the disinfection zone allows the process to be measured through ORP and turbidity scales. Both of these effects can be measured and quantified by digital instruments currently available. The preferred instruments are George Fischer digital ORP meter and transmitter, and the HACH 1720E digital Turbidimeter. These instruments yield a 4-20 ma output that can be monitored from the 450 (Program Logic Controller), which controls overall system operations.

The regulatory environment for discharge of treated wastewater into the ocean varies from location to location around the world. Typically Total Suspended Solids (TSS), Biochemical Oxygen Demand (BOD) and Fecal Coliform are the primary constituents regulated. TSS may be measured directly and immediately, during, and after treatment with existing instrumentation. Both Fecal Coliform and BOD require sampling and laboratory testing after waiting for a specified period of time. Thus wastewater treatment operators must wait the specified period of time before learning whether the treated wastewater has been sufficiently treated to have permitted discharge. At least in part because of distrust in technology prior to this invention, some operators have been known to hold effluent until reaching water outside of regulatory restrictions—even when using in a certified, properly functioning treatment device. As a result, real time effluent quality monitoring for these two constituents is not currently achievable, creating uncertainty as to the real-time continuous quality of effluent from wastewater treatment.

For example, United States 33 Code of Federal Regulations Part 159 subpart E establishes perhaps the most restrictive treated wastewater effluent discharge standards in the world today. Applying to cruise vessels when in certain waters of the State of Alaska, these ships must meet effluent quality standards of not more than 30 milligrams per liter TSS, 20 colony forming units per 100 milliliters Fecal Coliform and 30 milligrams per liter BOD. Typically ships with marine sanitation devices certified to meet these standards as a result of testing are permitted to discharge in these waters. However, spot-checking of ships by the State of Alaska has revealed that numerous ships are out of compliance even though they are operating certified systems, and they are prevented from further discharge until corrective action is accomplished. The causes for failure are numerous, but lack of real-time effluent monitoring capability has prevented instantaneous recognition of out-of-compliant system operation so that action might be taken to cease discharging.

Given that a properly sized and properly functioning UV unit operating in water of acceptable UV transmittance characteristics will effectively destroy or reduce to acceptable levels harmful bacteria, including the regulated Fecal Coliform, we have found that measuring ORP and turbidity of treated wastewater as soon as immediately after treatment can be used to forecast BOD. Measurable indication of BOD treatment compliance effectiveness at the time of discharge and displayed through the PLC control center 450 is now possible because both ORP and turbidity can be monitored immediately after treatment. Thus, to reduce the uncertainty of treatment compliance time for wastewater, it is preferred to take the following steps: (1) obtain a sample of effluent from a wastewater treatment train, (2) measure Turbidity, and (3) Measure Oxidation Reduction Potential (ORP), and (4) comparing that to pre-determined levels based on site-specific regulations.

Continuous monitoring of ORP and Turbidity through installed measurement devices connected to the PLC control center 450 indicates BOD levels within the effluent in real time. Indication of BOD (30 milligrams per liter) concentration compliance with 33CF159 subpart E requirement is provided if ORP is greater than 200 mV and turbidity is less than 3 NTU. Compliance with the international standard specified in International Convention for the Prevention of Ships Annex IV at 50 milligrams per liter is also indicated by ORP being greater than 200 mV and turbidity less than 3 NTU. This gives the operator an accurate active indication of compliance with modern standards not available through another means. Other BOD regulatory criteria can be achieved in a similar manner on a case-by-case basis.

This unique relationship takes into account both the visible (suspended solids) and the invisible (dissolved organics) through the use of turbidity, UV transmittance, and ORP. While the exact relationship between measured UV Transmittance and BOD not yet known, it is expected that testing would shown it to be a critical parameter that will be of more use than turbidity to predict BOD compliance.

Visible organics will register in higher turbidity and dissolved organics will register in lower transmittance and reduced ORP levels. Biological treatment systems that do not use advanced oxidation lack the necessary water chemistry to utilize this ratio and therefore cannot be monitored for compliance in real time. The use of the oxidation reaction in the configuration listed yield ORP levels that are high enough to affect a readable ratio. Previous attempts at this type of oxidation did not yield a readable, repeatable ratio because the levels, if they were observed, were not high enough to affect a ratio. Since the readings are both digital and inferred electronically, effluent quality data can then be easily transmitted from ship to shore for off ship effluent quality monitoring and system troubleshooting.

An alternate method for predicting BOD levels would be to recreate the unique advanced oxidation water chemistry by injecting ozone or other oxidizer into the stream at the appropriate location, expose to UV light, measure ORP and turbidity levels.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A method for treating wastewater comprising the acts (steps) of:
   treating a first influent in a blackwater treatment train, the blackwater treatment train comprising the acts (steps) of:
   screening the first influent in a blackwater screening zone,
   clarifying a blackwater screening zone effluent in a clarifying zone,
   reducing sludge from the clarifying zone in a sludge reduction zone,
   filtering clarification zone effluent in a blackwater filtration zone,
   advanced oxidation of a blackwater filtration zone effluent (permeate) in a blackwater advanced oxidation zone, and
   discharging a blackwater advanced oxidation zone effluent,
   treating a second influent in a graywater treatment train, the graywater treatment train comprising the acts (steps) of:
   screening the second influent in a graywater screening zone,
   treating screened solids from the graywater screening zone in the sludge reduction zone,
   filtering a graywater screening zone effluent in a graywater filtration zone, treating filtered solids (retentate) from the graywater filtration zone in the sludge reduction zone, advanced oxidation of a graywater filtration zone effluent (permeate) in a graywater advanced oxidation zone, and reusing an advanced oxidation zone effluent.

2. The method for treating wastewater of claim 1, wherein the blackwater advanced oxidation zone comprises a blackwater stirred reactor.

3. The method for treating wastewater of claim 2, the blackwater advanced oxidation zone further comprising the acts (steps) of:

infusing a clarification zone effluent with ozone prior to entering the blackwater stirred reactor, and oxidizing the ozonated clarification zone effluent in the blackwater stirred reactor.

4. The method for treating wastewater of claim 1, wherein the blackwater advanced oxidation zone comprises the act (step) of disinfecting with ultraviolet light.

5. The method of claim 1, the sludge reduction zone comprising the acts (steps) of:

adding a graywater filtration zone effluent (retentate), oxidizing the sludge with ozone, removing an oxidized sludge for disposal, and sending a sludge reduction zone effluent to the blackwater clarifying zone.

6. The method for treating wastewater of claim 1 wherein the graywater treatment train does not commingle with the blackwater treatment train.

7. The method for treating wastewater of claim 1 wherein the first influent comprises graywater from kitchen operations.

8. The method for treating wastewater of claim 1, further comprising the act (step) of directing a second graywater filtration zone effluent (permeate) to the blackwater treatment train.

9. The method for treating wastewater of claim 1, the graywater filtration zone comprises the act (step) of ultrafiltration.

10. The method for treating wastewater of claim 1, the graywater advanced oxidation zone comprises a graywater stirred reactor.

11. The method for treating wastewater of claim 10, the graywater advanced oxidation zone comprising the acts (steps) of:

infusing the graywater filtration zone effluent (permeate) with ozone prior to entering the graywater stirred reactor, oxidizing the graywater filtration zone effluent (permeate) in the graywater stirred reactor.

12. The method for treating wastewater of claim 1, the graywater advanced oxidation zone comprising the act (step) of disinfecting with ultraviolet light in a disinfection zone.

13. The method for treating wastewater of claim 1, further comprising the act (step) of directing a second graywater advanced oxidation zone effluent to the clarifying zone.

14. The method for treating wastewater of claim 1, further comprising the act (step) of discharging a third graywater advanced oxidation zone effluent.

* * * * *